United States Patent
Selvarajan

(10) Patent No.: US 9,345,280 B2
(45) Date of Patent: May 24, 2016

(54) USING UV UNWRAPPING TO CREATE MANUFACTURING PATTERNS FOR CUSTOM PRINTS

(71) Applicant: Balamurugan Selvarajan, Bangalore (IN)

(72) Inventor: Balamurugan Selvarajan, Bangalore (IN)

(73) Assignee: v Personalize Inc., San Francisco, CA (US)

( * ) Notice: Subject to any disclaimer, the term of this patent is extended or adjusted under 35 U.S.C. 154(b) by 480 days.

(21) Appl. No.: 14/046,010

(22) Filed: Oct. 4, 2013

(65) Prior Publication Data
US 2015/0100145 A1 Apr. 9, 2015

(51) Int. Cl.
*A41H 43/00* (2006.01)
*G06T 15/04* (2011.01)
*A41D 27/08* (2006.01)

(52) U.S. Cl.
CPC ............... *A41H 43/00* (2013.01); *A41D 27/08* (2013.01); *G06T 15/04* (2013.01)

(58) Field of Classification Search
None
See application file for complete search history.

(56) References Cited

U.S. PATENT DOCUMENTS

| 6,473,671 | B1* | 10/2002 | Yan | A41H 3/007 700/134 |
| 8,174,539 | B1* | 5/2012 | Samaniego | G06T 15/04 345/418 |
| 2004/0049309 | A1* | 3/2004 | Gardner | A41H 1/00 700/132 |
| 2004/0227752 | A1* | 11/2004 | McCartha | A41H 3/007 345/419 |

OTHER PUBLICATIONS

Wang "Customer participating 3D garment design for mass personalization", Textile Research Journal, 81(2) 187-204, 2011.*

* cited by examiner

*Primary Examiner* — Maurice L McDowell, Jr.

(57) ABSTRACT

This invention is a method for automating the generation of manufacturing patterns for apparel and accessories directly from designs created on a 3-dimensional (3D) model. This differs from existing models in which users design "2D slices" of a 3D image created at various pre-defined angles. This invention includes the steps of: 1) Making the UV map of the 3D model exactly match the manufacturing pattern in shape and scale; 2) Positioning the various components in the UV map to facilitate the desired image or text flow; and 3) Using a UV unwrap method to produce the manufacturing patterns with the exact art and text on each component. Images and text are thereby allowed to span across seams and be accurately manufactured. Automation of this process ensures that the images and text on the manufacturing patterns are the exact same as that which the user designed.

1 Claim, 3 Drawing Sheets

UV Unwrapping to get back the manufacturing patterns with the user design.

Figure 1: A typical 3D model (101) and its UV map (102)
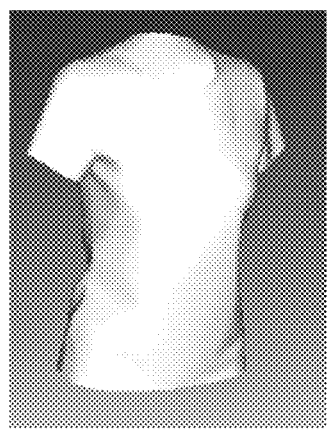 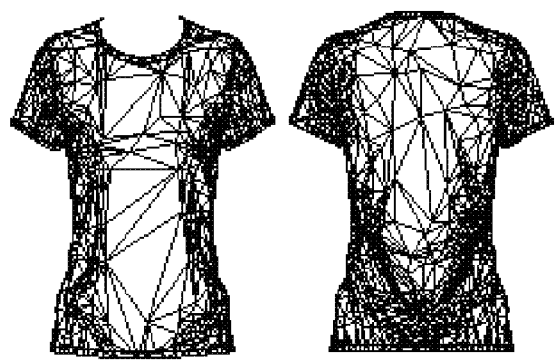
101
102
Figure 2: Typical manufacturing pattern (CAD model, to size)
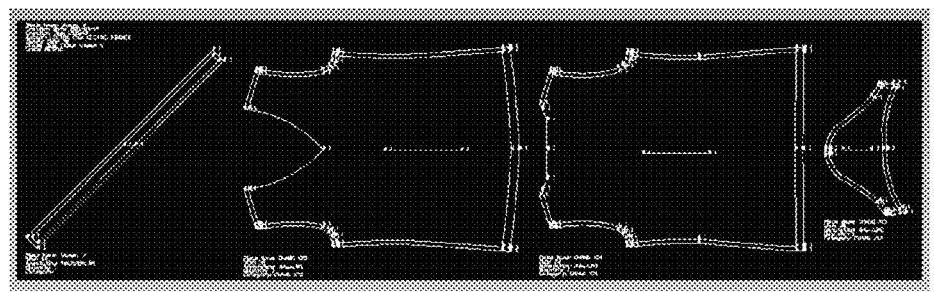
103

Figure 3: 3D model in figure 1, with its UV map matching the manufacturing patterns.
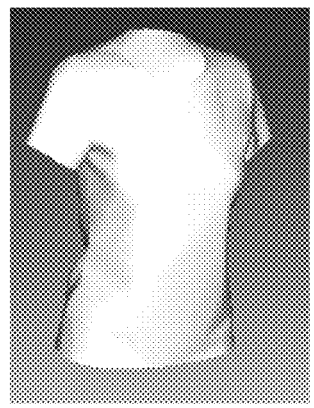 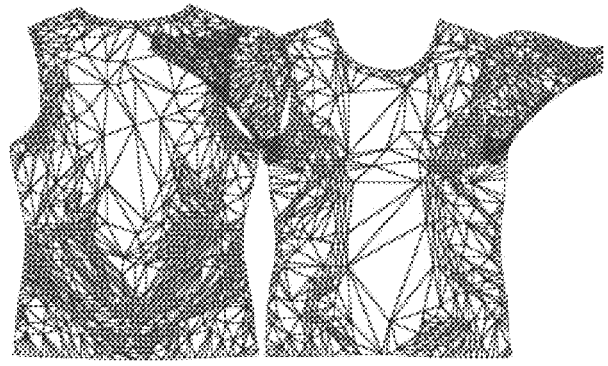
101
104
Figure 4: Designing on the finished 3D model
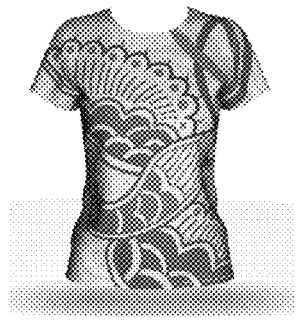
105

Figure 5: UV Unwrapping to get back the manufacturing patterns with the user design.
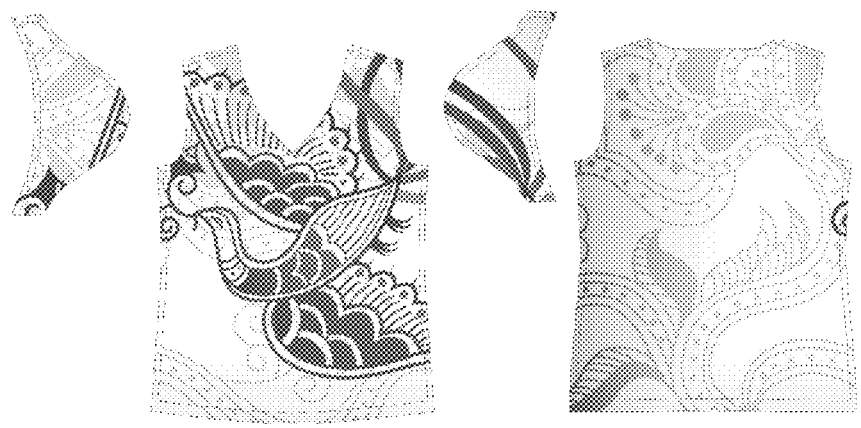
106
Figure 6: Finished and manufactured apparel
107

USING UV UNWRAPPING TO CREATE MANUFACTURING PATTERNS FOR CUSTOM PRINTS

BACKGROUND OF THE INVENTION

1. Field of the Invention

The present invention relates to the automation of manufacturing pattern generation of apparel and accessory, wherein a design, image or text created by a user on a 3D model is captured and generated as patterns for manufacturing.

2. Description of Related Art

The concept of custom prints on apparel has been around for a long time. In most cases, users are allowed to design on a 2D model or "2D slices" of a 3D image created at various pre-defined angles. The method of designing on a 3D model is also not new. But in no case has a free-form design been allowed with images and text spanning seams, which are then used to automatically generate manufacturing patterns. Needless to say automation is the only way to guarantee that the accuracy of the images and text on the manufacturing patterns are the exact same as that the user designed. What is new in this invention is the use of manufacturing patterns as the basis for creating the UV maps, so that UV unwrapping produces the manufacturing patterns with the exact user design. This automates the manufacturing pattern generation of apparel and accessory, wherein a design created by a user on a 3D model is captured exactly and generated for manufacturing.

The use of UV maps for texturing and showing images on a 3D model has been around for decades. Almost all 3D editing software support the automatic generation of UV by projection, or other methods. These methods have been traditionally used for gaming and 3D animations, where the focus is on creating an UV to easily show realistic textures on the model, and never for manufacturing automation.

BRIEF SUMMARY OF THE INVENTION

The present invention outlines a method for automating the generation of manufacturing patterns directly from designs created on a 3D model by 1) making the UV map of the 3D model exactly match the manufacturing pattern in shape and scale (or size). 2) Placing various components in the UV map to facilitate the desired image or text flow 3) Designing on the said model and using any UV unwrap method or image cutting method to get the manufacturing patterns with the exact art and text on each component.

BRIEF DESCRIPTION OF THE DRAWINGS

FIG. 1: Shows a typical 3D model (101) and its UV map (102)

FIG. 2: Shows a typical manufacturing pattern for T shirt (103)

FIG. 3: Shows the same 3D model in FIG. 1, but with the UV map modified to be a scaled down replica of the manufacturing pattern (104)

FIG. 4: Shows a design applied to this 3D model (105)

FIG. 5: Shows the unwrapped UV (106) with the applied design. Since the UV is a replica of the manufacturing pattern, the unwrapped UV is the final pattern for manufacturing.

FIG. 6: Show the manufacturing pattern cut and stitched, producing the apparel

DETAILED DESCRIPTION OF THE INVENTION

The present invention details a method for automating the generation of manufacturing patterns directly from designs created on a 3D model. The key parts of this invention are 1) Making the UV map of the 3D model exactly match the manufacturing pattern in shape and size (or scaled down size) 2) Placing various components of the 3D model in the UV map to facilitate the desired image or text flow (example, front to back clockwise, over both sleeves, etc) 3) Designing on the said 3D model and using any of the method of UV unwrapping or "image cutting" to get back the UVs (and consequently the manufacturing patterns) with the composite design images and text.

In one embodiment of this invention, the 3D model and its UV are scaled down as compared to the actual size of the manufacturing pattern. This is done so that a user can design over the network or Internet on a smaller sized model and scaled down images, which are faster to transmit and faster to design on, on the client. All the user manipulations are, then recorder and reproduced on the original image to original scale on the server, and the UV unwrapping is carried out to original size on the server, to generate the manufacturing patterns.

In another embodiment of the invention, the entire process is carried out on the client side, wherein the user manipulation of the design are carried out directly to original scale on the original image which resides on the client itself, thereby generating the final manufacturing patterns. In yet another embodiment of the invention, a combination of the two approaches can be used.

FIG. 1 shows one embodiment of a 3D CAD model (101) and its UV map (102). As can be seen, the UV map is a direct projection of the 3D model. Although, this UV is sufficient to create any texture, color, image or design for display on the 3D (design to 3D), there is no way to map what is on the 3D model back to a manufacturing pattern (3D to pattern) suitable for making that apparel or accessory.

FIG. 2 shows one embodiment of a manufacturing pattern for a woman's T shirt. This particular embodiment uses a 2D CAD model created as DXF, although other embodiments can use other formats.

FIG. 3 shows one embodiment of the same 3D model (101), but with its UV modified to accurately replicate the manufacturing pattern in shape and scale, but not in size. An exact replica to size is not necessary, although it can be used.

FIG. 4 shows one style or user design applied to the said 3D model. A user design is said to be applied, when one or more images, design or text is applied to the 3D model with the help of UV mapping. Any number of images can be applied. Images with transparency (PNG or GIF) can be used to overlay other images. Vector images (EPS, PDF, AI, etc) can be applied directly or as is more common, rasterized and applied. Texts can also be placed anywhere on the model. So long as the final composite of all other images, designs, texts and transformations can be computed, the manufacturing patterns can be generated.

FIG. 5 shows the unwrapped UV (106) with the applied designs. Since the UV is a replica of the manufacturing pattern, the unwrapped UV is nothing but the manufacturing pattern, but, now with the composite design. Unwrapping can be done in many ways. In one embodiment, "cut patterns" resembling the manufacturing patterns are overlaid on the final composite image, extracting the manufacturing patterns. In another embodiment of the system, the UV coordinates of each face of the 3D model are applied to the original image (scaled up appropriately, as required) and the images for each such area are "stitched" together to create the final unwrapped pattern. The computation for this approach would be:

pattern(x)=original image at face(x,y), where $(x,y) = (u * img\_size/uv\_size, v * img\_size/uv\_size)$ As can be seen from FIG. 5, various markings and annotations can be added to the pattern during the unwrapping process to aid manufacturing. For example, the left sleeve can be marked with a "L" or ".", and the right sleeve with "R" or "..". Additionally, guide lines can be introduced to clearly mark seam allowance to aid cutting and stitching.

FIG. 6 shows the unwrapped patterns, stitched together to make the actual apparel. Notice how the sleeves were printed separately, but the image align properly across seams, post-stitching. As can be clearly seen, the software has been implemented and the system has been tested and in operation.

I claim:

1. A method for allowing a user to design on a 3D model of an apparel or accessory and automatically generating the manufacturing patterns for the said apparel or accessory with the corresponding design, comprising the following steps:

Creating the 3D model wherein the UV map of the said model exactly matches the corresponding manufacturing pattern in shape & scale; and Arranging the various components of the 3D model in the UV map to facilitate the desired image or text flow; and Designing on the said 3D model and Using any method of UV unwrapping or image cutting to get back the UVs (and consequently the manufacturing patterns) with the corresponding design composite.

* * * * *